United States Patent
Galli

(10) Patent No.: US 11,105,325 B2
(45) Date of Patent: Aug. 31, 2021

(54) ONE-WAY VALVE DEVICE

(71) Applicant: FIAC S.P.A., Sasso Marconi (IT)

(72) Inventor: Mauro Galli, Bologna (IT)

(73) Assignee: FIAC S.R.L., Sasso Marconi (IT)

(*) Notice: Subject to any disclaimer, the term of this patent is extended or adjusted under 35 U.S.C. 154(b) by 263 days.

(21) Appl. No.: 16/253,067

(22) Filed: Jan. 21, 2019

(65) Prior Publication Data

US 2019/0249654 A1 Aug. 15, 2019

(30) Foreign Application Priority Data

Feb. 14, 2018 (IT) .......................... 102018000002688

(51) Int. Cl.
*F04B 39/10* (2006.01)
*F04B 53/10* (2006.01)
*F16K 15/02* (2006.01)

(52) U.S. Cl.
CPC ........ *F04B 39/102* (2013.01); *F04B 39/1033* (2013.01); *F04B 39/1066* (2013.01); *F04B 53/103* (2013.01); *F16K 15/028* (2013.01)

(58) Field of Classification Search
CPC ................ F04B 39/102; F04B 39/1033; F04B 39/1066; F04B 53/103; F16K 15/028
USPC ......................................... 137/454.4, 543.19
See application file for complete search history.

(56) References Cited

U.S. PATENT DOCUMENTS

| 1,483,436 A | | 2/1924 | Hazard |
| 2,506,306 A | * | 5/1950 | Mantle ................ F16K 15/12 |
| | | | 137/516.15 |
| 2,969,804 A | | 1/1961 | Tolkien |
| 3,473,626 A | * | 10/1969 | Toda ........................ F01N 3/22 |
| | | | 181/237 |
| 2004/0047751 A1 | | 3/2004 | Kim et al. |

FOREIGN PATENT DOCUMENTS

| DE | 704775 C | 4/1941 |
| WO | 2008127763 A1 | 10/2008 |

OTHER PUBLICATIONS

Italian Search Report dated Oct. 5, 2018 for counterpart Italian Patent Application No. IT 201800002688.

* cited by examiner

*Primary Examiner* — P. Macade Nichols
(74) *Attorney, Agent, or Firm* — Timothy J. Klima; Shuttleworth & Ingersoll, PLC

(57) ABSTRACT

A one-way valve device for air compressors including a disc-shaped element having a plurality of holes for flow of the air distributed along a portion having a circular crown extension, a sheet superposed on the disc-shaped element for occluding the holes, the sheet being susceptible to lifting due to the pushing action exerted by the air flowing through the holes, a spring opposing the lifting of the sheet, a containment and covering dome.

18 Claims, 2 Drawing Sheets

ONE-WAY VALVE DEVICE

This application claims priority to Italian Patent Application 102018000002688 filed Feb. 14, 2018, the entirety of which is incorporated by reference herein.

BACKGROUND OF THE INVENTION

This invention relates to a one-way valve device.

More specifically, this invention relates to a one-way valve device for sucking/discharging air in air compressors.

The valve devices are used in alternative compressors to allow, during the inlet step, entry of air to compress inside the cylinder, and, during the outlet step, the outflow of the compressed air from the cylinder.

The widespread valve devices in the past in the technical field of air compressors had a significant axial extension which had a negative effect on the overall size of the head of compressor and, hence, on the compressor itself.

The valve devices currently most widespread are those of the elastic lamina type, wherein the lamina, under the action of the air, sucked or compressed, deforms to create an opening for the air into or out from the cylinder of the compressor.

These types of valve devices, both on account of their dimensions and the mechanical and/or intrinsic properties of the materials used are not always fully effective in terms of filling of the cylinder and also of the noise generated.

SUMMARY OF THE INVENTION

The aim of this invention is to provide a valve device which is free of the drawbacks of the prior art devices.

A further aim of this invention is to overcome the drawbacks of the prior art by means of a valve device which is efficient and at the same time simple and inexpensive to make.

The technical features of the invention according to the above-mentioned objects may be easily inferred from the present disclosure.

BRIEF DESCRIPTION OF DRAWINGS

The advantages of the present invention are more apparent from the detailed description which follows, with reference to the accompanying drawings which illustrate a preferred embodiment of the invention provided merely by way of example without restricting the scope of the inventive concept, and in which.

DESCRIPTION OF PREFERRED EMBODIMENTS

Figure 1:
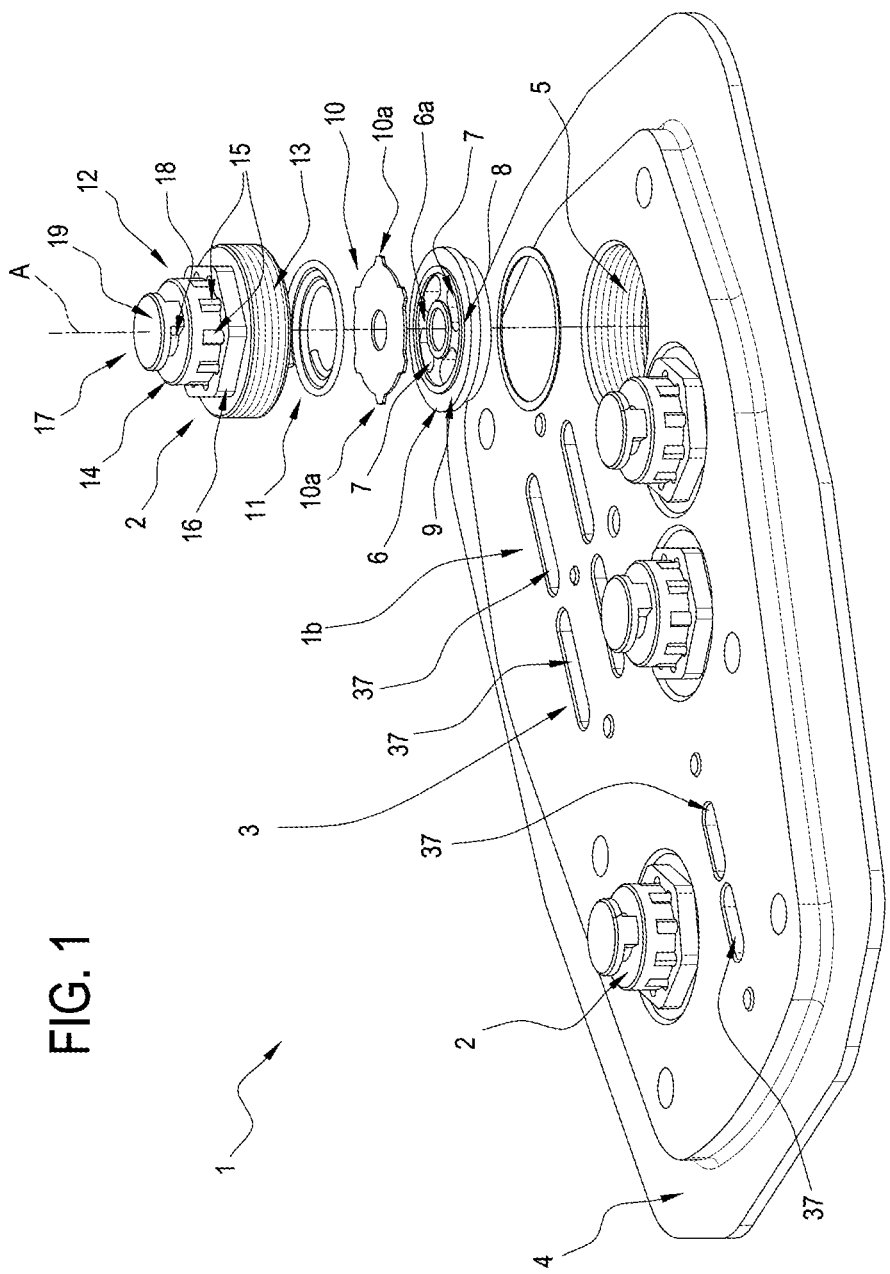
FIG. 1 is a schematic perspective view from above, with some parts in an exploded view, of a head for compressors equipped with valve devices made according to the invention.

With reference to the accompanying drawings, the numeral 1 denotes in its entirety a valve supporting head of an air compressor, not illustrated, of an alternative type.

Purely by way of example, the valve supporting head 1 illustrated is designed for a twin cylinder compressor, to cover the top of the cylinders and adjust the flow of inflowing/outflowing air.

The valve supporting head 1 comprises a plurality of valve devices 2 made in accordance with the invention.

The head 1 also comprises a plurality of elastic lamina valves 3 of substantially known type.

Advantageously, according to the preferred embodiment illustrated in the accompanying drawings, the valve devices 2 according to the invention are dedicated to the flow of the compressed air flowing out from the cylinder whilst the elastic lamina valves 3 are used for the flow of air entering the cylinder.

As described more clearly below, the valve device 2 according to the invention is of the one-way type, that is to say, a valve which allows a flow according to a single direction of flow.

The valve supporting head 1 comprises a plate 4 for housing valve devices 2 and elastic lamina valves 3 to which the plate 4 is, in use, fixed stably on the top of the compressor cylinders.

Figure 2:
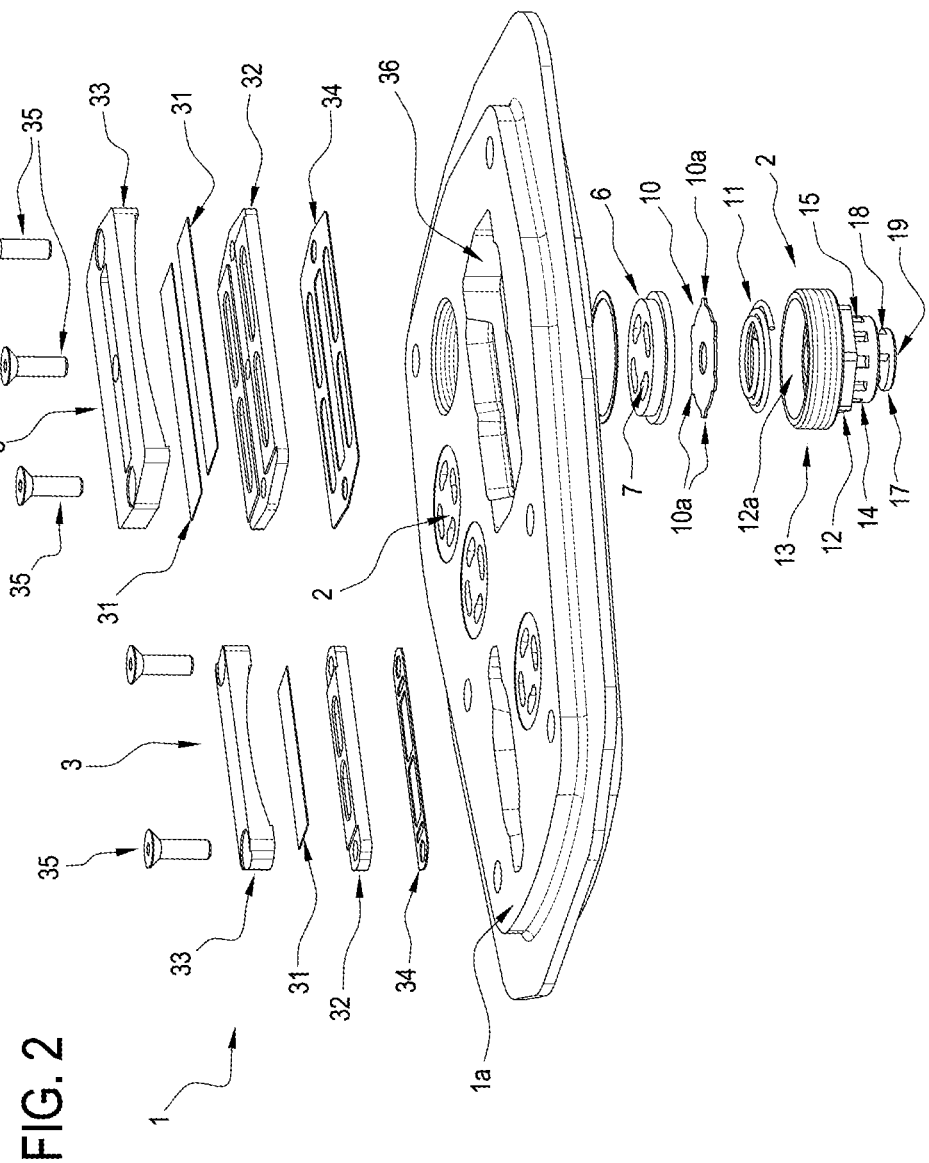
FIG. 2 illustrates the head of FIG. 1 viewed from a different angle, with some parts in an exploded view.

As clearly illustrated in FIGS. 2 and 1, the head 1 has a first flat face 1a, or lower face, and a second face 1b, or upper face, opposite the flat face 1a, the upper face 1b not being flat but having protrusions defined basically by the valve devices 2.

The flat face 1a faces in use towards the inside of the cylinders.

As illustrated in FIG. 1, the valve head 1 supports a plurality of valve devices 2 inserted in respective threaded cylindrical housings 5 of which only one is shown in the drawings.

Again with reference to FIG. 1, the valve device 2 comprises a disc-shaped element 6 which has a plurality of holes 7 for flow of the air distributed along a respective portion 6a having a circular crown extension.

The holes 7 made in the disc-shaped element 6 advantageously have an elliptical shape.

At the above-mentioned portion 6a having a circular crown extension, for delimiting it, the disc-shaped element 6 has an inner edge 8 and an outer edge 9, concentric with each other.

The outer edges 8 and 9 are positioned raised relative to the remaining surface of the disc-shaped element 6.

The valve device 2 also comprises a sheet 10 superposing the disc-shaped element 6 for the occlusion of the above-mentioned holes 7.

The sheet 10 is therefore normally supported on the disc-shaped element 6.

More specifically, the sheet 10 makes contact with the above-mentioned concentric inner and outer edges 8, 9 of the disc-shaped element 6.

The sheet 10 is also susceptible to rising by the pushing action exerted on it by the air flowing through the holes 7 of the disc-shaped element 6.

The sheet 10 is therefore movable between a lowered configuration, resting on the disc-shaped element 6 at which the holes 7 are closed and the flow of air is prevented, and a raised configuration, relative to the disc-shaped element 6, at which the air circulates through the holes 7.

As clearly illustrated in FIG. 1, the valve device 2 comprises a spring 11 opposing the lifting of the sheet 10.

In other words, the spring 11 exerts an opposing action with respect to the lifting of the plate 10 and, consequently, the opening of the holes 7, in such a way as to guarantee the closing in the absence of a predetermined flow of air and sufficient to overcome the elastic force exerted by the spring 11.

The spring 11 is advantageously a helical spring.

Alternatively, according to alternative embodiments, not illustrated, the spring 11 is of the cup type.

As illustrated in FIG. 1, the valve device 2 comprises a containment and cover dome 12, designed to house inside it both the spring 11 and the sheet 10.

The dome 12 has a first externally threaded cylindrical portion 13 which is designed to engage by screwing with an above-mentioned threaded cylindrical housing 5.

As illustrated in FIG. 2 in which the dome 12 is illustrated from a different point of view than that of FIG. 1, it has a cylindrical inner surface 12a corresponding to the above-mentioned first cylindrical threaded portion 13.

The dome 12 has a second cylindrical portion 14 on a side surface of which are made a plurality of first openings 15 for flow of the air.

The first and second cylindrical portions 13, 14 of the dome 12 are coaxial and therefore have a shared central axis A.

The first openings 15 are advantageously rectangular in shape and have the long side of the respective rectangle positioned parallel to the above-mentioned central axis.

Interposed between the above-mentioned first externally threaded cylindrical portion 13 and second cylindrical portion 14, the dome 12 comprises a gripping zone 16 with a hexagonal shape designed to engage with a clamping tool such as a common spanner.

With reference to FIG. 1, the dome 12 has a third top portion 17, emerging from the second cylindrical portion 14 and having second openings 18 for flow of the air, of which only one is visible in the drawing.

The third top portion 17 has a covering plate 19 configured to direct the air flowing through the second openings 18 transversally relative to the central axis A.

As illustrated in the accompanying drawings, the sheet 10 has the form of a circular crown and has a plurality of radial protruding portions 10.

The radial protruding portions 10a are designed to keep the sheet 10 in a centering position with respect to the inner cylindrical surface 12a of the dome 12.

In other words, by means of the radial protruding portions 10a the sheet 10 remains substantially centred inside the cylindrical surface 12a even during its axial movements moving away from and towards the disc-shaped element 6.

Moreover, between two adjacent radial protruding portions 10a there is an empty space, not occupied by the sheet 10, which contributes to defining the air passage escaping from the holes 7, is directed to the first and second openings 15, 17.

As illustrated in FIG. 2, each valve 3 has an elastic sheet 31 normally resting on a suitable flat support 32.

The elastic sheet 31 is closed in the form of a sandwich between the above-mentioned support 32 and a curved contact element 33.

The curved contact element 33, the elastic sheet 31 and the above-mentioned flat support 32 are closed in a pack and inserted, with an interposed seal 34, by means of screws 35, in a suitable housing cavity 36 made in the plate 4.

As illustrated in FIG. 1, suitable openings 37 for flow of the air leading into the cavities 36 are made on the plate 4.

When deformed by the action of the air, each elastic sheet 31 bends and rests on the relative curved element 33 thereby determining the opening of the corresponding valve 3.

In use, the one-way valve device 2 according to the invention is designed to adjust the flow of the air according to a single direction of through flow.

More in detail, assuming by way of example that the valve device 2 acts, as mentioned, to regulate the flow of the compressed air discharged from the cylinder, not illustrated, of the compressor, it can be seen, with reference to FIG. 1, that air under pressure pushes through the holes 7 of the disc-shaped element 6.

With the sheet 10 resting on the inner 8 and outer 9 edges of the disc-shaped element 6, the pressurized air will therefore exert its pushing action on the sheet 10.

Against the sheet, to keep it in contact with the above-mentioned edges 8, 9 of disc-shaped element 6, acts the elastic force exerted by the helical spring 11.

When the air pressure reaches a predetermined value, the air is able to overcome the opposing action of the helical spring 11 thus being able to lift the sheet 10 from the disc-shaped element 6.

The sheet 10 slides in an axial direction, that is, according to the direction of the central axis A, inside the inner cylindrical surface 12a of the dome 12.

Thanks to the relative protruding portions 10a, which remain substantially in contact with the above-mentioned inner cylindrical surface 12a, the sheet 10 maintains a relative centred position even during detachment from the disc-shaped element 6.

With the sheet 10 raised, the compressed air arriving from the holes 7 is free to flow towards the second cylindrical portion 14 and the third top portion 17 and then escape through the respective first and second openings 15, 18.

As soon as the sheet 10 lifts from the disc-shaped 6, the air flows both in the central hole of the sheet 10 and in the above-mentioned empty spaces between the adjacent radial protruding portions 10a.

The valve device according to the invention achieves the preset aims and brings important advantages.

A first advantage connected to the valve device is due to the form of a circular crown of the sheet 10 which, together with the presence of the radial protruding portions 10a, makes it possible to maximize the opening for flow of the air without renouncing a correct and secure positioning of the sheet 10 also during its movement for detachment from the disc-shaped element 6.

This ensures a regular and constant operation of the valve device 2.

As mentioned, the compressed air flowing through the raised sheet 10 is directed towards the second and third openings 15, 18 made on the dome 12.

The presence of a multiplicity of openings, in particular the high number of first openings 15, allows a corresponding high splitting of the overall opening for the flow of air from the valve device 2.

Experimental tests have shown that this splitting makes it possible to considerably reduce the noise generated by the outflowing air.

This constitutes a further advantage related to the valve device 2 according to the invention.

Experimental tests have in fact shown that the noise generated by the air flowing out from a valve device 2 according to the invention is less than that generated by an elastic lamina valve 3 of known type.

Moreover, as shown in the valve support head 1 illustrated in the accompanying drawings, the valve devices 2 according to the invention, designed for the supply of compressed air at the outlet, are advantageously combined with elastic lamina valves 3 used for the flow of air at the inlet.

It has been shown experimentally that this combination advantageously enables an optimum and better management of the air flows and consequently better filling and emptying of the cylinder, thereby achieving a greater operational efficiency of the compressor.

Yet another advantage linked to the valve device 2 according to the invention is connected to the fact of being able to extend the first openings 15 for flow of the air in an axial direction. This circumstance allows the opening for flow of the compressed air to be increased regardless of the area occupied on the plate 4. This increase in the opening for the flow of compressed air, together with the splitting described above, produces benefits both in the cooling of the air and the reduction of the noise generated.

What is claimed is:

1. A one-way valve device for air compressors comprising:
   a disc-shaped element including having a plurality of holes for flow of the air, the holes being distributed along a portion having a circular crown extension,
   a sheet superposed on the disc-shaped element for occluding the holes, the sheet being susceptible to lifting due to a pushing action exerted by the air flowing through the holes,
   a spring opposing the lifting of the sheet,
   a containment and covering dome, the containment and covering dome housing the spring and the sheet and including:
      an externally threaded cylindrical first portion:
      a cylindrical second portion including at least one lateral surface;
      a plurality of first openings for the flow of the air, the first openings being positioned on the at least one lateral surface.

2. The valve device according to claim 1, wherein the sheet is shaped as a circular crown and includes a plurality of radial protruding portions, the radial protruding portions being configured for centering the sheet with respect to a cylindrical inner surface of the containment and covering dome.

3. The valve device according to claim 2, wherein the radial protruding portions are distributed at equal angular intervals along a circumference of the sheet.

4. The valve device according to claim 1, wherein the containment and covering done includes interposed between the externally threaded cylindrical first portion and the cylindrical second portion, a gripping zone with a hexagonal shape configured to engage a clamping tool.

5. The valve device according to claim 1, wherein the containment and covering dome includes a top third portion, emerging from the cylindrical second portion and including a second opening for flow of the air.

6. The valve device according to claim 5, wherein the third top third portion includes a covering plate configured to direct the air flowing through the second opening, transversally relative to a central axis of the cylindrical second portion.

7. The valve device according to claim 1, wherein the disc-shaped element includes inner and outer concentric edges configured to make contact with the sheet.

8. A valve head for a compressor comprising the valve device according to claim 1.

9. The valve head according to claim 8, and further comprising at least one flexible lamina valve.

10. A one-way valve device for air compressors comprising:
    a disc-shaped element including a plurality of holes for flow of the air, the holes being distributed along a portion having a circular crown extension,
    a sheet superposed on the disc-shaped element for occluding the holes, the sheet being susceptible to lifting due to a pushing action exerted by the air flowing through the holes,
    a spring opposing the lifting of the sheet,
    a containment and covering dome, the containment and covering dome housing the spring and the sheet and including:
       an externally threaded cylindrical first portion:
       a cylindrical second portion including a plurality of laterally oriented first openings for the flow of the air.

11. The valve device according to claim 10, wherein the sheet is shaped as a circular crown and includes a plurality of radial protruding portions, the radial protruding portions being configured for centering the sheet with respect to a cylindrical inner surface of the containment and covering dome.

12. The valve device according to claim 11, wherein the radial protruding portions are distributed at equal angular intervals along a circumference of the sheet.

13. The valve device according to claim 10, wherein the containment and covering dome includes, interposed between the externally threaded cylindrical first portion and the cylindrical second portion, a gripping zone with a hexagonal shape configured to engage a clamping tool.

14. The valve device according to claim 10, wherein the containment and covering dome includes a top third portion, emerging from the cylindrical second portion and including a second opening for flow of the air.

15. The valve device according to claim 14, wherein the top third portion includes a covering plate configured to direct the air flowing through the second opening, transversally relative to a central axis of the cylindrical second portion.

16. The valve device according to claim 10, wherein the disc-shaped element includes inner and outer concentric edges configured to make contact with the sheet.

17. A valve head for a compressor comprising the valve device according to claim 10.

18. The valve head according to claim 17, and further comprising at least one flexible lamina valve.

* * * * *